United States Patent Office 3,097,153
Patented July 9, 1963

3,097,153
PROCESS FOR THE PREPARATION OF HYDROGENATED ORGANIC COMPOUNDS AND PRODUCTS RESULTING THEREFROM
Karl W. Hubel and Emile Henri Braye, Brussels, Belgium, assignors to Union Carbide Corporation, a corporation of New York
No Drawing. Filed Mar. 31, 1960, Ser. No. 18,840
Claims priority, application Great Britain Apr. 7, 1959
10 Claims. (Cl. 204—158)

This invention relates to the preparation of organic compounds and to products resulting therefrom. More particularly, it relates to a process for the preparation of partially or completely hydrogenated linear or cyclic organic compounds.

The present invention greatly facilitates the synthesis of substituted or unsubstituted organic compounds in that it provides a new and general one-step method for this purpose. The invention is predicated upon the discovery that when certain organo-metallic complexes as hereinafter described, whose organic part contains a preformed carbon skeleton, are reacted with compounds containing at least one element or reactant capable of forming stable bonds with the skeleton, the bonding of the element to the skeleton is readily achieved. The compounds formed thereby are characterized as containing at least one of the carbon skeletons and at least one of the elements.

Although the mechanism of the reaction is not yet fully understood, basic considerations applying to the inventive process can be found in the following discussion. It is believed that organo-metallic complexes as for example, $Fe_2(CO)_6(RC_2R)_2$ or $Fe_2(CO)_7(RC_2R)_2$ can be represented by the structures respectively shown below, wherein the actual meaning of R has been disregarded for the sake of clarity.

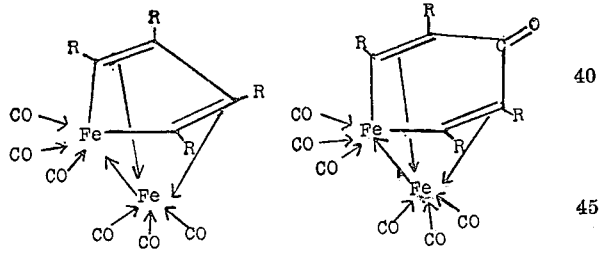

There are various evidences which indicate that the two iron atoms contained in these organo-metallic complexes have different chemical behavior. In particular it has been found that the iron atom bonded into the ring system can be more readily removed than the other iron atom. It can thus be foreseen that the splitting of the iron atoms which occurs during the reaction isolates a highly reactive carbon skeleton which can readily react with any element capable of forming stable bonding with that carbon skeleton. Similar considerations apply to the various organo-metallic complexes containing only one metal atom or one ($R'C_2R''$) group and apply as well to the complexes having a larger number of metal atoms or ($R'C_2R''$) groups in their structure. It is therefore apparent that by properly selecting the reactant containing an element capable of forming stable bondings with the carbon skeleton, a large variety of organic compounds can be provided.

According to this invention, a process for the preparation of partially or completely hydrogenated linear or cyclc organic compounds comprises reacting an organo-metallic complex having the formula:

$$M_x(CO)_y(R'C_2R'')_z(B)_w$$

with a hydrogenation reagent. In the above referred to organo-metallic complexes, M represents a transition metal belonging to the VI, VII or VIII sub groups of the periodic table, CO represents a carbonyl group, R' and/or R" may be the same or different and represent hydrogen, halogeno, carboalkoxy, alkyl, aryl, cycloaliphatic, alkoxy or silyl groups and the like, including the substituted derivatives thereof, $C_2$ represent a carbon to carbon bonding, B represents a member selected from the group consisting of hydrogen, mercury, halogen, alkyl, aryl or acyl, $x$ represents an integer of from 1 to 4, $y$ represents an integer of from 1 to 10, $z$ represents an integer of from 1 to 6, and $w$ represents an integer of from 0 to 4.

Typical organo-metallic complexes suitable for use in the process of this invention include:

$Fe_2(CO)_6(RC_2R')_2$, wherein R represent a phenyl or ethyl group or a hydrogen atom and wherein R' represents a phenyl, methyl, ethyl or methoxy group or a halogen atom. $Fe_2(CO)_8(RC_2R')_2(B)_2$ wherein R and R' represent hydrogen and B represents either hydrogen or a methyl group. These complexes may be represented by the following structure:

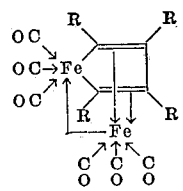

$Fe_2(CO)_7(RC_2R')_2$, wherein R and R' represent phenyl groups. This complex may be represented by the following structure:

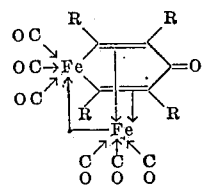

$Fe_2(CO)_6(RC_2R')$, wherein R and R' represent phenyl groups. This complex may be represented by the following structure:

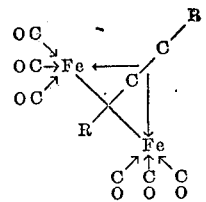

$Fe(CO)_4(RC_2R')_2$, wherein R represents a phenyl group and wherein R' represents a phenyl group or a hydrogen atom. This complex may be represented by the following structure:

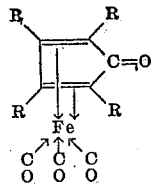

$Fe(CO)_6(RC_2R')$, wherein R represents a hydrogen atom or a phenyl group and wherein R' represents a hydrogen atom. This complex may be represented by the following structure:

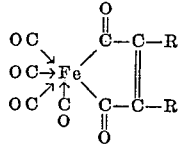

Fe$_3$(CO)$_8$(RC$_2$R')$_2$, wherein R and R' represent phenyl groups. This complex may be represented by the following structure:

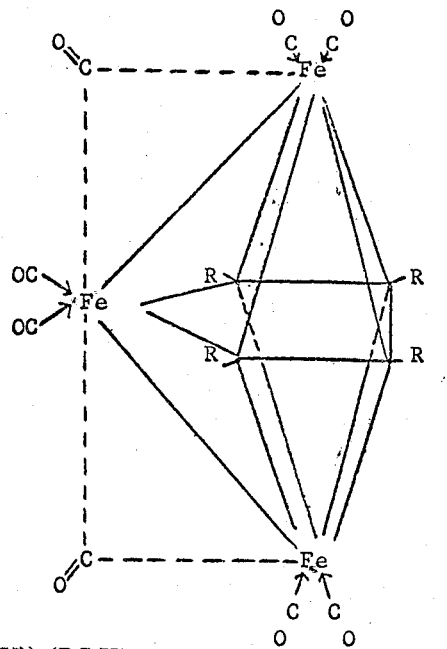

Fe$_2$(CO)$_6$(RC$_2$H)$_3$, wherein R represents a phenyl group. This complex may be represented by the following structure:

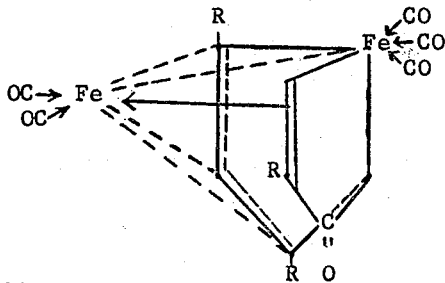

Fe(CO)$_4$(RC$_2$H)$_3$, wherein R represents a phenyl group or a hydrogen atom. This complex may be represented by the following structure:

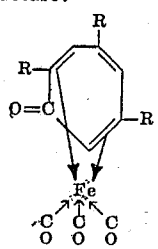

Co$_2$(CO)$_6$(RC$_2$R'), wherein R represents a phenyl group and R' represents a phenyl group or a carbomethoxy group. This complex may be represented by the following structure:

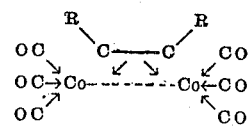

Co$_2$(CO)$_4$(RC$_2$R')$_3$, wherein R represents a carboethoxy or methyl group or a hydrogen atom and wherein R' represents a phenyl group or a trimethylsilyl group. This complex may be represented by the following structure:

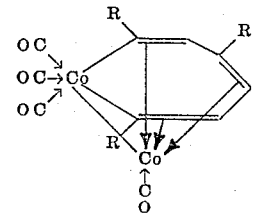

Co$_2$(CO)$_6$(RC$_2$H)$_4$Hg, wherein R represents a tertiary butyl or trimethylsilyl group. This complex may be represented by the following structure:

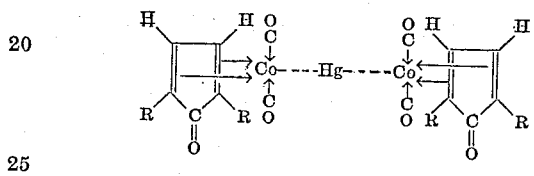

Co$_2$(CO)$_6$(RC$_2$H)$_4$, wherein R represents a tertiary butyl or trimethylsilyl group. This complex may be represented by the following structure:

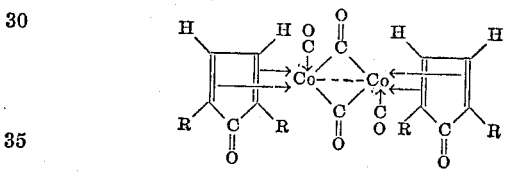

Co$_3$(CO)$_9$H(RC$_2$H), wherein R represents a phenyl group. This complex may be represented by the following structure:

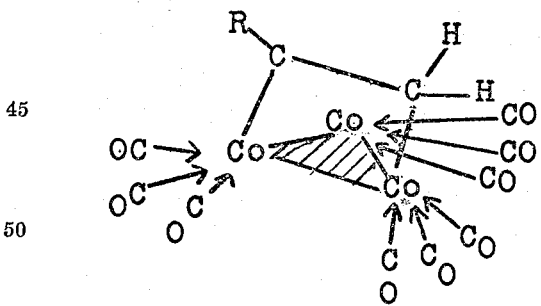

Ni(CO)$_2$(RC$_2$R')$_4$, wherein R and R' represent phenyl groups. This complex may be represented by the following structure:

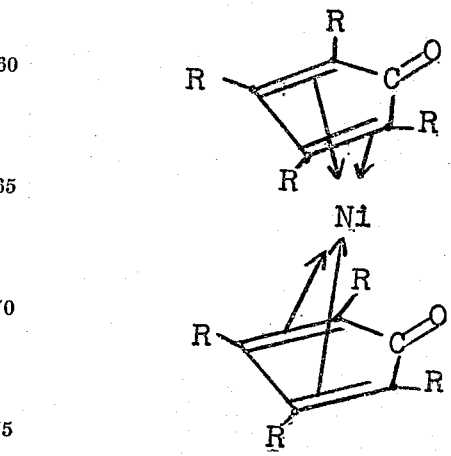

and
$$Mo_2(CO)_4(\phi C_2\phi)_5$$

Other useful organo-metallic complexes are those in which the transition metal is ruthenium, rhodium, palladium, osmium, iridium, platinum, manganese, rhenium, chromium or tungsten, or are those in which the carbonyl group bonded to the metal is partially replaced by a nitrosyl, a substituted stibine, a substituted arsine, or a substituted phosphine.

The organo-metallic complexes employed as starting materials in the present invention may be conveniently prepared by the process described in copending application 707,111, entitled "Organo-Metallic Compounds and Method for Their Preparation," filed January 6, 1958, in the name of Karl Walter Hubel, the description thereof being incorporated herein by reference.

Briefly stated, the organo-metallic complexes can be prepared by reacting an acetylenic compound with a metal carbonyl in a non-aqueous neutral medium at a temperature of between room and 300° C. As a consequence, a stable organo-metallic carbonyl reaction product is formed. The acetylenic reactant has the formula:

$$R'C{\equiv}CR''$$

wherein R' and R'' represent a substituent selected from the group consisting of hydrogen, an organic group, and substituted derivatives thereof, a functional group and substituted derivatives thereof and an organo-substituted hydride group, the substituent being substantially inert to and inactive with the carbonyl group. The metals of the metal carbonyl group are selected from the group consisting of iron, nickel, ruthenium, rhodium, palladium, osmium, iridium, platinum, manganese, rhenium, chromium, molybdenum, cobalt and tungsten.

Any hydrogenation reagent may be employed in the practice of this invention. Exemplary of the hydrogenation reagents that may be employed in the process of this invention are: lithium aluminum hydride, sodium boron hydride, sodium amide, sodium in liquid ammonia, Na-Hg, Li/diethylamine, nascent hydrogen, hydrogen with conventional hydrogenation catalysts and strong acids such as hydrochloric acid and sulfuric acid, particularly in alcohol solutions. However, for the purpose of this invention it is preferable to employ lithium aluminum hydride, sodium in liquid ammonia, sodium amalgam in various organic solvents, hydrochloric acid and sulfuric acid.

The process of this invention can be carried out using stoichiometric amounts of the starting materials. However, it has been found that an excess of the aforesaid hydrogenation reagents is generally preferable. The reaction is usually carried out in a polar or non-polar organic solvent such as benzene, petroleum ether, ether, tetrahydrofuran, beta-ethoxy ethanol and the like. When side reactions are to be avoided, the selected solvent should preferably be of an inert kind. However, no addition of solvent is necessary when one of the starting materials is liquid at the reaction temperature.

The reaction is usually achieved by heating the reaction mixture, or by activating the reaction mixture with ultraviolet radiations, or by combining both heating and ultraviolet radiations. However, when employing reactants normally used at relatively low temperatures such as sodium in liquid ammonia, it is advisable to cool the reaction mixture down to 0° C. or lower. Generally speaking, the reaction temperature at which the process of this invention may be carried out ranges from about —60° C. to about 250° C. The specific temperatures employed will, of course, depend upon the nature of the reactants employed. It is preferable to perform the reaction in a closed system whenever one of the reactants, or the reaction products formed thereby or the solvent employed, are too volatile at the reaction temperatures.

The reaction is usually completed within a few hours, although longer reaction times may be necessary in some instances. The reaction products are easily removable from the reaction mixture after completion of the reaction using any suitable technique. The technique of removal will of course vary according to the nature of the reaction product and the occurrence of side reactions. Suitable process conditions will be further illustrated in the specific examples hereinafter described relating to the present invention.

Typical compounds prepared by the process of this invention may be illustrated by the following general formulae:

(A)    $RCH{=}CR{-}CR{=}CHR$ (B)    $RCH_2{-}CHR{-}CHR{-}CH_2R$ (C)    $RCH{=}CR{-}CHR{-}CH_2R$ (D)    $RCH{=}CHR$ (E)    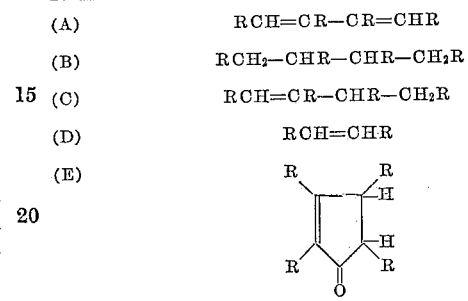

wherein R represents hydrogen or hydroxyl, halogeno, carboalkoxy, alkyl, aryl, cycloaliphatic, alkoxy or silyl groups, including the substituted derivatives thereof. These substituted alkane, alkene, butadiene and cyclopentenone compounds are by way of illustration only. The hydrogenated compounds produced by this invention will also include many other representative cis or trans, linear or cyclic types of compounds. Generally speaking, the hydrogenated compounds formed by the process of this invention will contain at least one $(R'C_2R'')$ unit wherein R' and R'' have the meanings previously defined.

The invention may be further illustrated by the following examples:

Example I

To 1 gram of $LiAlH_4$ in 150 ml. tetrahydrofuran (THF) a solution of 0.5 gram $Fe(CO)_3(C_6H_5C_2C_6H_5)_2$ in THF was added under stirring. After 1 hour, the reaction mixture was treated with ethanol, and then with dilute hydrochloric acid. The mixture was then extracted with benzene and the organic phase was dried over $CaCl_2$ and the excess of solvent evaporated. The residue was thereupon crystallized from ethanol yielding 0.3 gram (92%) of 1,2,3,4-tetraphenylbutadiene (M.P. 182–184° C.).

When the reduction was carried out with Na in liquid $NH_3$ at —60° C., the complex being initially dissolved in a mixture of THF and absolute ethanol (10 ml.), the stereoisomer, M.P. 185° C. (3% yield) is also obtained.

Example II

To 1 gram of $Fe_2(CO)_6(C_6H_5C_2C_6H_5)_2$ dissolved in 200 ml. ether, a solution of 0.9 gram $LiAlH_4$ in ether is added under stirring. After one hour at room temperature, the reaction mixture was refluxed for one hour. Then, following the procedure described in Example I, a yield of 0.36 gram (66%) of 1,2,3,4-tetraphenyl-butene-1, M.P. 151–152° C. was obtained.

Example III

A solution of 4 grams $Fe_3(CO)_8(C_6H_5C_2C_6H_5)_2$ in 100 ml. THF was added to 4 grams of $LiAlH_4$ in 300 ml. THF. After refluxing the mixture for 1½ hours, 1 gram (51%-yield) of 1,2,3,4-tetraphenyl-butene, M.P. 185° C. was obtained plus a small amount of 1,2,3,4-tetraphenyl-butene-1.

Example IV

To 2 grams of $FE_2(CO)_7(C_6H_5C_2C_6H_5)_2$, dissolved in a mixture of 50 ml. THF and 100 ml. acetic acid, there was added 15 ml. of concentration HCl. The mixture was refluxed for 1½ hours. The reaction yielded 2,3,4,5-tetraphenyl-cyclopenten-2-one-1, having a M.P. of 163° C.

*Example V*

A solution of 1 gram $Fe_2(CO)_7(C_6H_5C_2C_6H_5)_2$ in tetrahydrofurane was added to a suspension of sodium amide, prepared from 10 grams Na in 100 ml. liquid $NH_3$. After 1 hour the ammonia was allowed to evaporate, $H_2O$ and $C_6H_6$ were added, and after drying, the organic layer was treated chromatographically. The benzene-ether fraction contained 0.03 gram 1,2,4,5-tetraphenyl-pentanone-3 as colorless needles having the M.P. 119–121° C.

*Example VI*

A solution of 2.32 grams (5 mM.)

$$Co_2(CO)_6(C_6H_5C_2C_6H_5)$$

in 30 ml. $CH_3OH$ containing 3.5 ml. $H_2SO_4$ (10 M.) was refluxed for 3 hours. The extraction with petroleum ether of the water diluted mixture yielded 0.135 gram (15%) trans-stilbene, M.P. 120° C.

*Example VII*

Following the same procedure as described in Example VI, but employing as the organo-metallic complex 2.23 grams (5 mM.) $Co_2(CO)_6(C_6H_5C_2COOCH_3)$, a yield of 20.5% methyl cinnamate was obtained.

*Example VIII*

A solution of 0.15 gram $Co_4(CO)_{10}(C_6H_5C_2C_6H_5)$ in 15 ml. $CH_3OH$ containing 2 ml. 30% $H_2SO_4$ was refluxed for ½ hour. The blue color disappeared and 0.03 gram trans-stilbene was extracted with petroleum ether.

*Example IX*

To a suspension of 1.5 grams $LiAlH_4$ in 150 ml. THF, a solution of 1 gram $Mo_2(CO)_4(C_6H_5C_2C_6H_5)_5$ in 100 ml. THF was added dropwise at room temperature in a period of 30 minutes. Afterwards, the mixture was stirred for about 3 hours. Excess of $LiAlH_4$ was destroyed by addition of water; after acidification with HCl, a part of THF was removed under vacuum and the mixture was extracted with benzene. Chromatography of the benzenic solution yielded:
(a) 0.12 gram of dibenzyl and small amounts of stilbene,
(b) 0.12 grams of 1:2:3:4-tetraphenyl-butadiene,
(c) Tetracyclone and
(d) 2:3:4:5-tetraphenyl-cyclopentene-2-one-1.

*Example X*

To a suspension of 1.5 gram $LiAlH_4$ in 150 ml. of THF, one added to a solution of 1 gram

$$Mo(CO)_2(C_6H_5C_2C_6H_5)_4$$

this mixture was heated for 2 hours at 60° C. By working up as in Example IX, the following product was obtained: 0.37 gram of a colorless compound (M.P.: 253–254° C.), the analysis of which corresponded to $(C_6H_5C_2H_5)_3H_2$:

ANALYSIS

| | Found | Theoretical cal. for $C_{42}H_{32}$ |
|---|---|---|
| C | 94.19 | 93.99 |
| H | 6.08 | 6.01 |
| M.W. | 539 | 536.72 |

The compounds produced by the process of this invention have art-recognized utility or will serve as intermediates in the production of compounds having a wide range of art-recognized utility.

For example, the cyclopentenones have utility as polar solvents particularly for organo-metallic reactions. The substituted butadiene compounds can be used in the production of synthetic rubber, as for example, polyisoprene.

Of course, the substituted ethylenic compounds have a wide range of uses but are particularly useful as monomers in the preparation of useful polymers. The compounds produced by the process of this invention can also serve as intermediates for the production of compounds which will have utility as plasticizers and stabilizers. Moreover, the cyclic ketonic structures can be employed in the production of lactones.

The cyclic ketones produced by the process of this invention are also useful as intermediates for the synthesis of fulvenes. They may also be employed as starting materials for the production of organo-metallic complexes and in particular π-complexes.

What is claimed is:
1. A process for the preparation of hydrogenated linear and cyclic organic compounds free of carbon to metal bonds, which comprises reacting an organo-metallic complex having the formula: $M_x(CO)_y(R'C_2R'')_z(B)_w$ wherein M is a transition metal selected from the group consisting of sub-groups VI B, VII B and VIII of the periodic table, CO represents a carbonyl group, R' and R'' represent a member selected from the group consisting of hydrogen, halogeno, carboalkoxy, alkyl, aryl, cycloaliphatic, alkoxy and silyl groups, $C_2$ represents a carbon-to-carbon bonding, B represents a member selected from the group consisting of hydrogen, mercury, halogen, alkyl, aryl and acyl, x represents an integer of from 1 to 4, y represents an integer of from 1 to 10, z represents an integer of from 1 to 6, and w represents an integer of from 0 to 4, with at least a stoichiometric amount of a hydrogenation reagent, whereby the carbon to metal bond in said organo-metallic complex is broken and hydrogen is added to the $C_2$ group present in said complex to form said organic compounds.

2. A process as claimed in claim 1, in which the metal of the organo-metallic complex is iron.

3. A process as claimed in claim 1, in which the metal of the organo-metallic complex is cobalt.

4. A process as claimed in claim 1, in which the metal of the organo-metallic complex is nickel.

5. A process as claimed in claim 1, in which the metal of the organo-metallic complex is molybdenum.

6. A process as claimed in claim 1, in which the hydrogenation reagent is a member selected from the group consisting of lithium aluminum hydride, sodium boron hydride, sodium amide, sodium in liquid ammonia, lithium diethylamine, hydrogen, hydrochloric and sulfuric acid.

7. A process as claimed in claim 1, in which a stoichiometric excess of the hydrogenation reagent is employed.

8. A process as claimed in claim 7, in which an organic solvent selected from the group consisting of benzene, petroleum ether, ether, tetrahydrofuran and beta-ethoxy ethanol is employed.

9. A process as claimed in claim 8, in which the reaction is carried out at a temperature of between −60° C. and 250 C.

10. A process as claimed in claim 1, in which the reaction mixture is initially activated by ultraviolet radiation.

References Cited in the file of this patent
UNITED STATES PATENTS

| 2,810,737 | Haven | Oct. 22, 1957 |
| 2,818,416 | Brown et al. | Dec. 31, 1957 |
| 2,849,470 | Benson | Aug. 26, 1958 |
| 2,852,542 | Sweeney | Sept. 16, 1958 |
| 2,898,359 | Leedham et al. | Aug. 4, 1959 |
| 2,916,503 | Kozikowski | Dec. 18, 1959 |